United States Patent [19]
Liu

[11] Patent Number: 5,081,714
[45] Date of Patent: Jan. 21, 1992

[54] VEHICLE INTERNAL SAFETY BELT

[76] Inventor: Ing-Nan Liu, No. 38, Muh Tah Rd., Sec. 1, Taipei, Taiwan

[21] Appl. No.: 584,531

[22] Filed: Sep. 18, 1990

[51] Int. Cl.⁵ .............................................. A41D 20/00
[52] U.S. Cl. ................................................ 2/2; 2/338; 2/308; 2/311; 297/393
[58] Field of Search ...................... 2/2, 308, 311, 317, 2/331, 336, 335, 338, DIG. 11, 171, 171.8; 244/122 R, 122 A, 122 AG, 122 B; 280/748, 801, 808; 297/464, 465, 466, 468, 486, 393, 391, 392, 397, 398, 399, 400, 406, 217

[56]  References Cited
U.S. PATENT DOCUMENTS

| | | | |
|---|---|---|---|
| 3,086,529 | 4/1963 | Munz et al. | 2/338 |
| 4,339,151 | 7/1982 | Riggs | 297/464 |
| 4,384,583 | 5/1983 | Speelman | 2/338 |
| 4,707,031 | 11/1987 | Meistrell | 297/393 |
| 4,723,325 | 2/1988 | Perry | 2/207 |

Primary Examiner—Werner H. Schroeder
Assistant Examiner—Gloria Hale
Attorney, Agent, or Firm—Bacon & Thomas

[57] ABSTRACT

A vehicle internal safety belt for holding one's head to the head-rest of a vehicle internal seat or for holding one's legs together, which is comprised of two identical belt bodies connected back to back at the middle. The middle part of each belt body is formed of an elastic band so that the safety belt is permitted to flexibly extend within a certain range. Each of the two belt bodies of the safety belt has a hook strip and a loop strip at two opposite ends so that one belt body can be fastened around the head-rest of a vehicle internal seat and the other belt body can be fastened around one's head to secure one's head to the internal seat. The two belt bodies can also be reversely fastened to secure one's two legs together to prevent the legs from opening apart while one is sleeping in a seat.

1 Claim, 1 Drawing Sheet

VEHICLE INTERNAL SAFETY BELT

BACKGROUND OF THE INVENTION

The present invention relates to vehicle internal safety belts, and more particularly to a vehicle internal safety belt for folding one's head to the head-rest of the vehicle internal seat, which can also be alternatively used for holding one's legs together.

Conventionally, a vehicle internal seat is generally equipped with a safety belt for fastening on one's waist to firmly secure a person to a seat. However, even if a person is fastened to a vehicle internal seat by a safety belt, a person's head is still not protected and may be shaken to hit a window glass or some part inside a vehicle during vehicle collision or sudden braking of the vehicle. Further, there is no means available in a vehicle seat to bind one's legs together while one is sleeping in a vehicle internal seat. Because it is ungraceful to unintentionally open the two legs apart while a women is sleeping in a vehicle internal seat, a woman may be constantly in a state of anxiety while sleeping in a vehicle internal seat.

SUMMARY OF THE INVENTION

The present invention has been accomplished under the circumstances in view. It is one object of the present invention to provide a vehicle internal safety belt which is practical and comfortable for holding one's head to the head-rest of a vehicle internal seat.

Another object of the present invention is to provide a vehicle internal safety belt which is practical and comfortable for holding one's legs together so as to prevent the legs from opening apart while one is sleeping.

According to the present invention, a vehicle internal safety belt is generally comprised of two identical belt bodies connected back to back at the middle. The middle part of each belt body is formed of an elastic band so that the safety belt is permitted to flexibly extend within certain range. Each of the two belt bodies of the safety belt has a hook strip and a loop strip connection assembly, such as Velcro at two opposite ends. The hook strip comprises a plurality of rows of hook-shaped fastening filaments arranged in a regular arc and said loop strip comprises a plurality of rows of loop-shaped fastening filaments arranged in a regular arc so that the rows of hook fastening filaments can be respectively attached to the rows of hook fastening filaments permitting the two opposite ends of each of the two belt bodies to be firmly connected together against tensile force. Therefore, one belt body can be fastened on the head-rest of a vehicle internal seat and the other belt body can be fastened on one's head to secure one's head to a vehicle internal seat. The two belt bodies can also be reversely fastened to secure one's two legs together preventing one's two legs from opening apart while one is sleeping in a seat.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
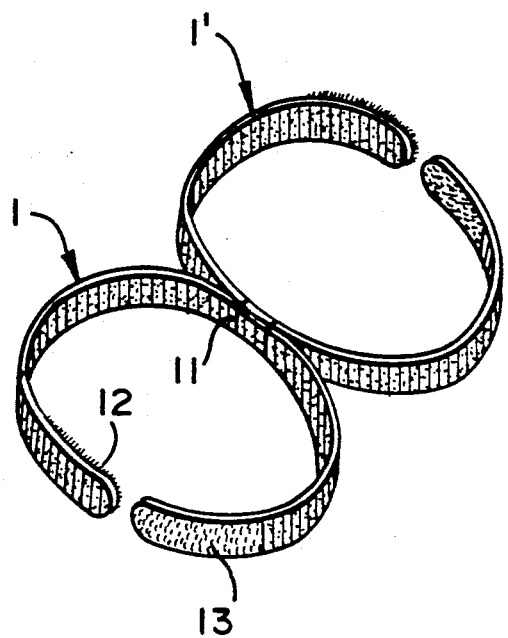
FIG. 1 is a schematic structural view of the present invention.

Referring to FIG. 1, a safety belt of the present invention is generally comprised of two identical belt bodies 1, 1' having each an elastic band portion 11 at the middle, a Velcro hook strip 12 at one end and a Velcro loop strip 13 at an opposite end. The elastic band portion 11 of a first belt body 1 is sewn up with that of a second belt body 1' so that the two identical belt bodies 1, 1' are connected back to back. The strip 12 comprises a plurality of rows of hook shaped fastening filaments arranged in a regular arc and the strip 13 comprises a plurality of rows of loop-shaped fastening filaments arranged in a regular arc, so that the rows of hook fastening filaments can be attached to the rows of loop fastening filaments, thereby permitting the two opposite ends of each belt body 1 or 1' to be firmly connected together against tensile force.

Figure 2:
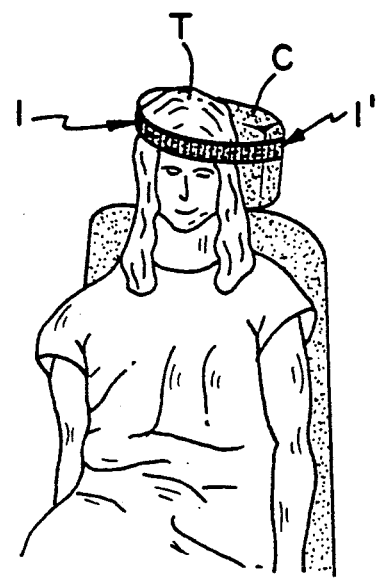
FIG. 2 illustrates the use of the present invention.
Figure 3:
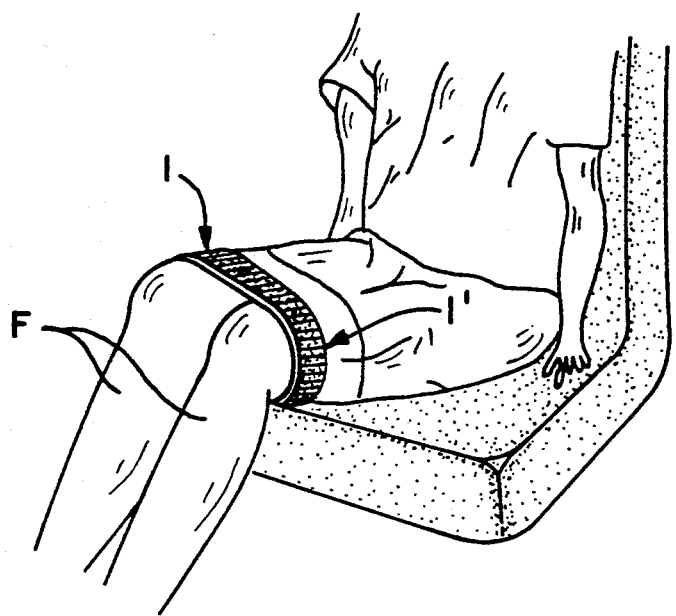
FIG. 3 illustrates an alternate use of the invention.

The strips 12 and 13 of each belt body 1, 1' can be connected together so that the safety belt of the present invention can be used to flexibly secure one's head to the head-rest of a vehicle internal seat or to flexibly bind up one's two legs together. As illustrated in FIG. 2, either belt body 1 or 1' is fastened on the head-rest C and the other belt body 1' or 1 is fastened on one's head T to secure one's heat T to the head-rest C. The two belt bodies 1 and 1' can be reversely fastened to secure one's two legs F together preventing one's two legs from opening apart while one is sleeping in a seat. The two elastic band portions 11 of the two belt bodies 1, 1' permitting the safety belt to flexibly extend within a certain range so that one does not become constrained.

As described above, the present invention is to provide a safety belt for firmly and flexibly holding one's head to the head-rest of a vehicle internal seat or holding one's legs together, which has been proved practical in use.

What is claimed is:

1. A safety belt for securing two members together comprising:
   a) a pair of substantially identical belt portions, each belt portion including a pair of opposite ends and a middle elastic part permitting the belt portion to be extended within a certain range of elasticity;
   b) the opposite ends of each belt portion being provided with cooperating hook and loop fastener means for permitting the ends to be detachably secured together;
   c) the belt portions being connected together at substantially their midpoints; and
   d) wherein the belt portions may be flexibly extended around and be secured to two adjacent members for maintaining the members together.

* * * * *